United States Patent
Gravatt et al.

[19]

[11] Patent Number: 5,930,852
[45] Date of Patent: Aug. 3, 1999

[54] HEAT EXCHANGING PUMP MOTOR FOR USAGE WITHIN A RECIRCULATING WATER SYSTEM

[75] Inventors: Eugene M. Gravatt, Las Flores; Dirk A. Caudill, Orange, both of Calif.

[73] Assignee: Aqua-Flo, Incorporated, Chimo, Calif.

[21] Appl. No.: 09/038,743

[22] Filed: Mar. 11, 1998

Related U.S. Application Data

[63] Continuation-in-part of application No. 08/822,326, Mar. 21, 1997, abandoned.

[51] Int. Cl.⁶ .............................. F28F 7/00; H02K 9/00; E04H 4/12
[52] U.S. Cl. .................................. 4/541.1; 4/493; 4/509; 417/367; 417/423.8; 417/423.13
[58] Field of Search .................................. 4/541.1–541.6, 4/492, 493, 509, 545; 417/366, 367, 423.8, 423.13; 165/47

[56] References Cited

U.S. PATENT DOCUMENTS

| | | | |
|---|---|---|---|
| 1,968,566 | 7/1934 | Moran et al. | 417/367 |
| 3,136,258 | 6/1964 | Bood | 417/367 |
| 3,333,544 | 8/1967 | Turk | 417/423.14 |
| 3,630,645 | 12/1971 | Eheim | 417/420 |
| 3,897,178 | 7/1975 | Palloch | 417/366 |
| 4,198,191 | 4/1980 | Pierce | 417/369 |
| 4,854,373 | 8/1989 | Williams | 165/46 |
| 5,038,853 | 8/1991 | Calloway, Sr. et al. | 165/46 |
| 5,092,951 | 3/1992 | Popovich et al. | 156/184 |
| 5,145,337 | 9/1992 | Kirkland | 417/423.14 |
| 5,172,754 | 12/1992 | Graber et al. | 165/47 |
| 5,178,523 | 1/1993 | Cheng-Chung | 417/423.3 |
| 5,199,116 | 4/1993 | Fischer | 4/541.2 |
| 5,283,915 | 2/1994 | Idland et al. | 4/541.1 |
| 5,332,369 | 7/1994 | Jensen | 417/423.8 |
| 5,338,162 | 8/1994 | Krarup | 417/367 |
| 5,393,207 | 2/1995 | Maher et al. | 417/423.14 |
| 5,509,463 | 4/1996 | Calloway, Sr. et al. | 165/46 |
| 5,585,025 | 12/1996 | Idland | 219/497 |

FOREIGN PATENT DOCUMENTS

| | | | |
|---|---|---|---|
| 467282 | 1/1992 | European Pat. Off. | 417/367 |
| 640667 | 7/1950 | United Kingdom | 417/367 |
| 2042075 | 9/1980 | United Kingdom | 417/367 |

*Primary Examiner*—Charles R. Eloshway
*Attorney, Agent, or Firm*—Jack C. Munro

[57] ABSTRACT

A pump which is designed to be mounted within a recirculating water system where a portion of the recirculating water is diverted and caused to flow through the pump with this recirculating water to absorb heat that is produced during the operation of the motor. The heated diverted water is then added back to the recirculating water system. The pump includes an electric motor which is mounted within a motor housing and is completely enclosed therein. An electrically insulative mounting arrangement mounts the motor relative to the motor housing preventing the conductance of electricity therebetween. The motor housing is filled with oil thereby submerging of the electric motor in oil. The motor housing is enclosed within a seal plate. Surrounding the motor housing is an annular chamber through which the liquid is caused to flow. A baffle arrangement is located within the annular chamber to direct the flow of the liquid so that all area across the surface of the pump housing has liquid flowing thereacross. The heat that is produced in the operation of the motor is absorbed by the oil which in turn is conducted through the motor housing to be absorbed by the diverted liquid prior to being added back into the recirculating liquid system. The impeller is mounted in conjunction with a wear ring which functions to properly align the impeller.

8 Claims, 3 Drawing Sheets

5,930,852

HEAT EXCHANGING PUMP MOTOR FOR USAGE WITHIN A RECIRCULATING WATER SYSTEM

REFERENCE TO PRIOR APPLICATION

This application is a continuation-in-part of patent application Ser. No. 08/822,326, filed Mar. 21, 1997, now abandoned, entitled LEISURE WATER HEATING APPARATUS, by the present inventors.

BACKGROUND OF THE INVENTION

1. Field of the Invention

The field of this invention relates generally to heat exchangers and more particularly to a heat exchanger in conjunction with a pump which is mounted within a recirculating water system where the heat of the motor is utilized to raise the temperature of the recirculating water.

2. Description of the Prior Art

The structure of the present invention is to be described in conjunction with a spa, hot tub or therapy tub which utilizes jet nozzles to circulate water within the tub where the tub may be occupied by one or more humans. However, the present invention could be used with liquids other than water. Such tubs have a circulating water system which utilizes a pump which has a motor with the motor causing rotation of a centrifugal impeller which functions to cause the water to move through the circulating system. It is desirable to heat the water within these tubs with generally this water being between one hundred degrees fahrenheit and one hundred and four degrees fahrenheit. A heater is generally included in conjunction with the tub with the heater functioning to raise the temperature of the recirculating water to the desired temperature level.

During the time that the tub is being used, the heat from the water is quickly lost to the ambient atmosphere. Therefore, this heat needs to be replaced. In the past, it has been common to activate the heater that is mounted in conjunction with the tub to reheat the water. However, it has been discovered that the electric motor of the pump for the recirculating water quickly becomes quite hot. It is desirable to have the motor temperature as low as possible to maintain an efficient operation, therefore it is beneficial to remove as much heat from the motor as possible.

It has been known to take some of the water that is being circulated through the system and pass that through the motor with the idea the water is used to extract the heat produced by the motor with this heat then being added back to the recirculating water. The advantage of such a heat exchange arrangement is that it increases the efficiency and longevity of operation of the motor of the pump and the heat that is normally wasted is being utilized therefore either eliminating or decreasing the requirement for an additional heater for heat to be added to the circulating water.

SUMMARY OF THE INVENTION

One of the primary advantages of the present invention is to construct a cost efficient and energy efficient heat exchange system for a circulating water system for a tub.

Another objective of the present invention is to provide for a more quiet operation of a pump motor within the circulating water system of a tub by utilizing of a heat exchange system to dampen the sound generated by the operation of the motor.

Another objective of the present invention is to provide for cooler operation of the motor which thereby increases longevity, efficiency and diminishes maintenance during the operating life of the motor.

The pump of the present invention utilizes a conventional electric motor which is formed of a stator and a rotor. The rotor is to be rotationally driven by the application of electrical energy to the stator. The rotor is connected to an output shaft which in turn is mounted in conjunction with an impeller. The impeller is located in a pump housing with said housing mounted in conjunction with the water conduit of the circulating water. The impeller is to function to move the water through the conduit. The stator and rotor are submerged within an oil which is contained in a completely closed chamber in the form of a motor housing. It is important to keep the stator not in electrical contact with the motor housing and therefore a pair of insulative rings are mounted between the stator and the motor housing to insure that the stator remains spaced at all times from the motor housing. These rings function to fixedly mount the stator relative to the motor housing. Surrounding the motor housing is an annular chamber with water to be diverted from the water conduit and caused to flow through this annular chamber and then back into the water conduit. The inlet and outlet to the annular chamber are located in the volute water stream at strategic locations to create a pressure differential between the inlet and outlet. In the annular chamber is mounted a baffle arrangement which functions to divert the flow of this bypass water in the annular chamber so as to cause water to flow throughout the entire volume of the annular chamber eliminating any stagnant areas of water within the annular chamber which tend to produce over heating pockets and reduce the heat exchanging efficiency.

BRIEF DESCRIPTION OF THE DRAWINGS

FIG. 4 is an exploded isometric view of the pump of this invention.

DETAILED DESCRIPTION OF THE PREFERRED EMBODIMENT

Figure 1:
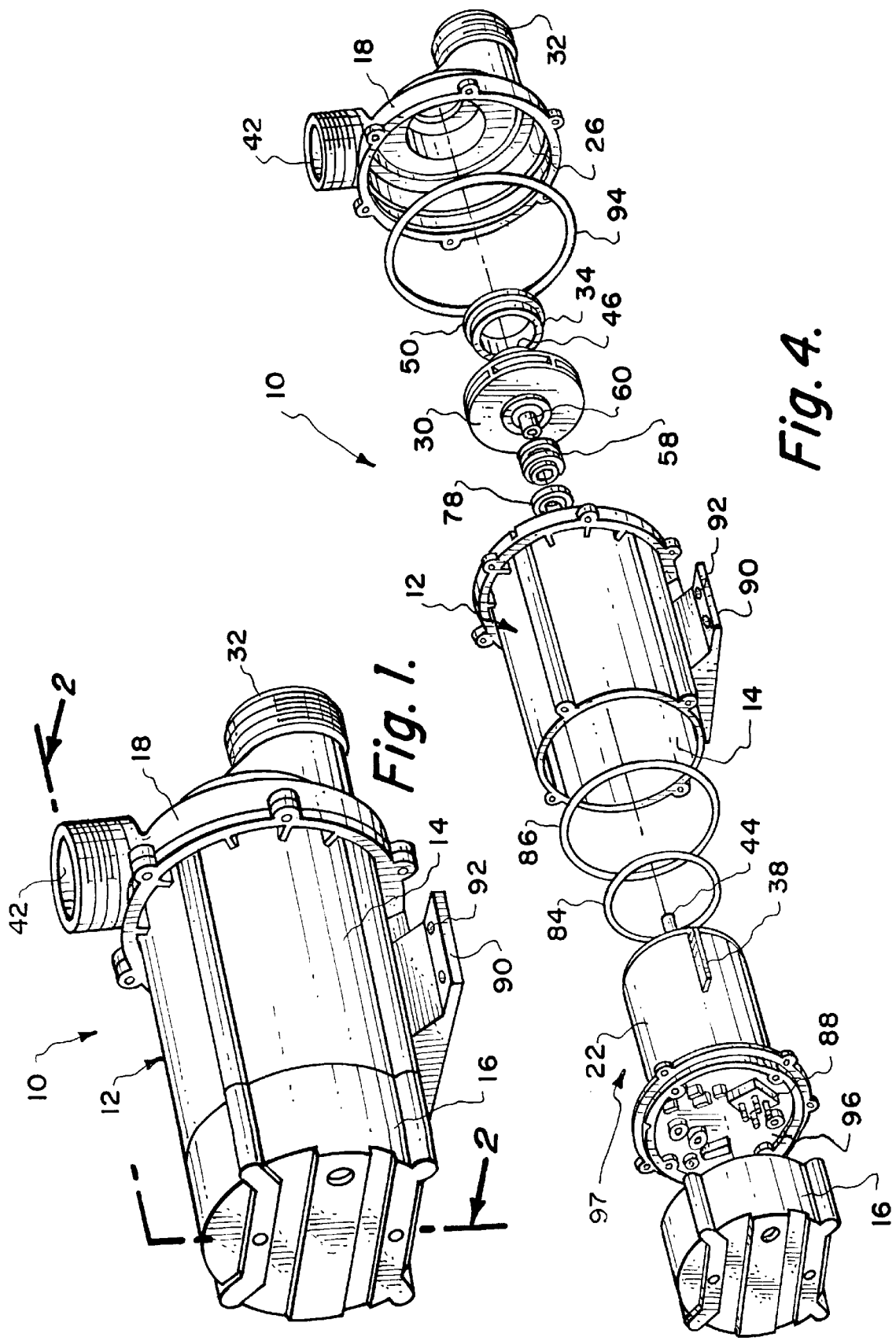
FIG. 1 is an exterior isometric view of the pump constructed in accordance with this invention.
Figure 2:
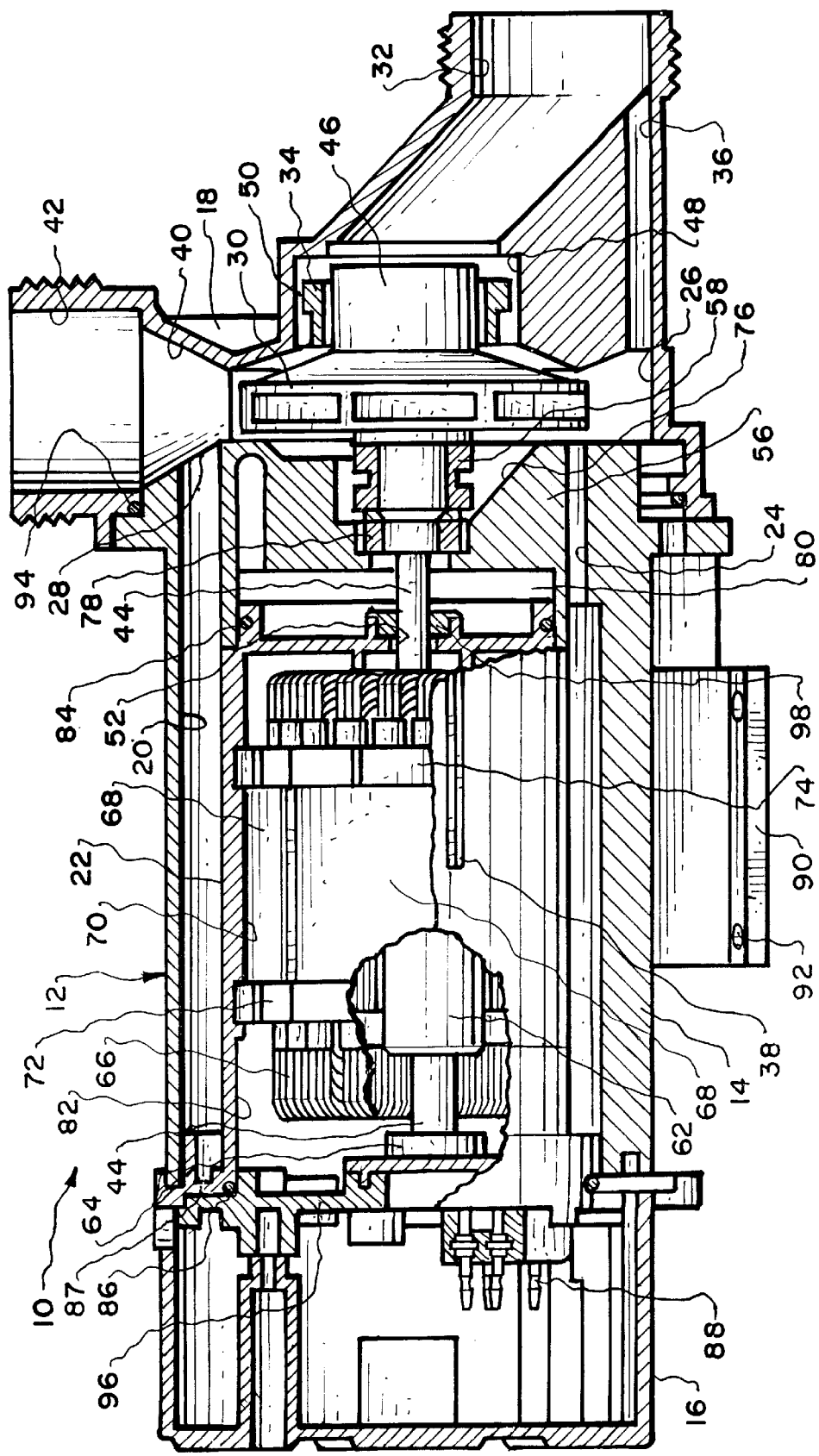
FIG. 2 is a transverse cross-sectional view through the pump of this invention taken along line 2—2 of FIG. 1.
Figure 3:
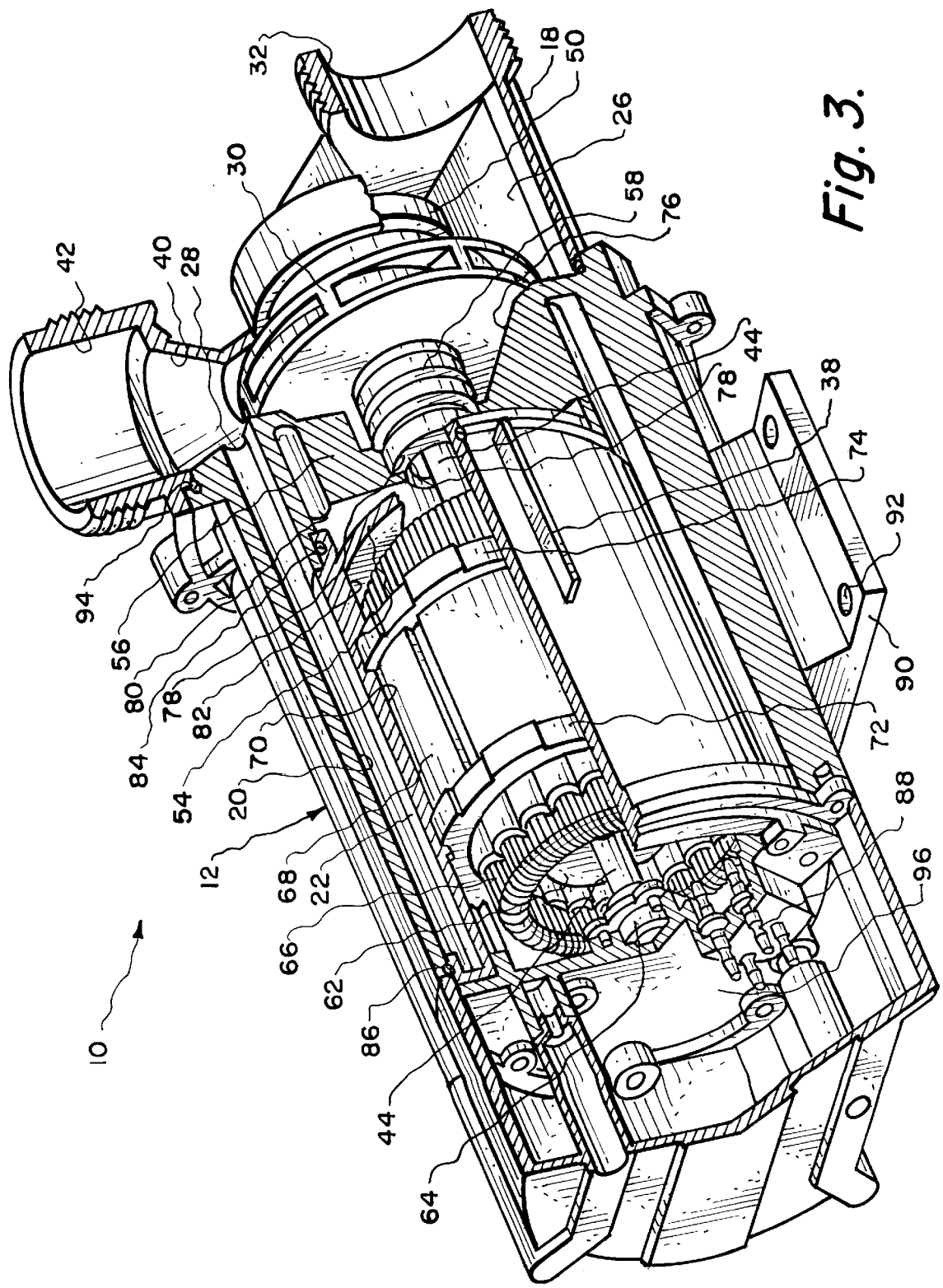
FIG. 3 is a partial cut-away isometric view of the pump of this invention.

Referring particularly to the drawings, there is shown the pump 10 of this invention. Pump 10 has a seal plate 12 which is basically cylindrical in shape. Seal plate 12 is formed of a center hollow section 14 to which is fixedly mounted a mounting flange 87 of a motor housing 22. The mounting flange 87 covers open end of the center hollow section 14. The opposite end of the center hollow section 14 has fixedly mounted thereon a volute section 18.

Center hollow section 14 becomes the internal chamber 20 when the motor assembly 97 is mounted to the seal plate 12. The motor housing 22 of the motor assembly 97 is also cylindrical. There is an annular space 20 located between the motor housing 22 and the seal plate 12 which forms the internal chamber 20. Access into the annular space 20 is by means of inlet passage 24 formed within the center hollow section 14. This inlet passage 24 connects to impeller chamber 26 formed within the volute section 18. The annular space 20 also has an outlet opening 28 which connects to the impeller chamber 26. It is to be noted that the inlet passage 24 connects with the impeller chamber 26 while the outlet opening 28 connects with the discharge chamber 40 downstream of the impeller 30.

A liquid, such as water, is to be supplied through inlet conduit 32 which is formed within the volute section 18. The water within the inlet conduit 32 is conducted past an impeller 30 into the impeller chamber 26. Due to pressure differential in the impeller chamber 26 when the impeller 30 is rotating at operating speed, a portion of the water is forced through the inlet passage 24 into the internal chamber 20 through the outlet opening 28 into discharge chamber 40. This water substantially fills the annular space 20 surrounding the motor housing 22.

It is desirable to have almost all of the water which is flowing through the annular space 20 to flow through the entirety of the chamber, encouraging extended heat exchanging contact with the motor housing. In order to encourage this flow direction to occur, there is mounted a baffle plate 38 on the exterior surface of the motor housing 22 located directly adjacent the inlet passage 24. There may be utilized a pair of such baffle plates 38, angularly spaced apart, with only one being shown. Also, the length of the baffle plate 38 may be increased or decreased from that what is shown with the selection of length being such to encourage the water to flow all the way to the longitudinal end of the annular space of the internal chamber 20. This is so that the water that is contained within the annular space of the internal chamber 20 is constantly being replaced with the heated water of chamber 20 being moved to and through outlet opening 28 into the cone-shaped outlet discharge chamber 40 of the volute section 18. From the discharge chamber 40, the water is caused to flow into outlet conduit 42.

A typical installation would be, as previously mentioned, in conjunction with a hot tub, spa or therapy pool. Typically, the water within these types of tubs is constantly being recirculated. The recirculating water is to be normally conducted through a filter (not shown) where the water is cleaned and then through a heater (not shown) and then back into the tub (not shown). The movement of the water through the recirculating system is accomplished by a pump with the pump 10 being exactly such a pump. The recirculating water is supplied into inlet conduit 32 into the pump 10 and then out from the pump 10 by means of the outlet conduit 42.

The impeller 30 normally is the part that incurs the single most amount of wear in the operation of the pump 10. In order to minimize this wear, the impeller 30 has a cylindrical extension 46. This cylindrical extension 46 is located within main supply chamber 48 formed within the volute housing 18. Mounted about this cylindrical extension 46 is a wear plate 34. The wear plate 34 constitutes no more than an annular sleeve with an annular raised section 50. This raised section 50 is to abut against the wall surface of the main supply chamber 48 in a loose fitting manner so that the wear ring 34 is freely rotatable relative to the main supply chamber 48. It is the function of the wear ring 34 to keep the impeller 30 properly aligned. Any longitudinal or transverse movements incurred by the impeller 30 in moving of the water into the outlet conduit 42 results in the wear plate 34 contacting the wall surface of the main supply chamber 48. The wear plate 34 is constructed of a material that is substantially softer than the material of construction of the volute section 18. Therefore, the wear plate 34 will tend to wear much quicker than the volute section 18. A typical material of construction for the wear plate 34 would be a plastic type of material. Generally, after a certain time period of operation of the pump 10, the wear plate 34 is replaced.

The output shaft 44 passes through center hole 52 of the closed end 54 of the motor housing 22. The oil is kept from leaking by seal 98. The seal plate 12 surrounds seal assembly 58 which is mounted about the output shaft 44 which operationally connects with an impeller shaft 60. The output shaft 44 is fixed to a rotor 62. The back end of the output shaft 44 is low frictionally supported by a bearing assembly 64. The rotor 62 is caused to rotate by means of electricity being supplied to the stator 66. The use of the rotor 62 and the stator 66 is deemed to be conventional. It is to be understood that the impeller 30, when rotated, centrifugally forces the water into the outlet conduit 42. The impeller 30 is mounted onto the output shaft 44 which causes the rotation of the impeller 30.

The stator 66 includes a center section formed of a circumferential series of stacked plates 68. It is important that there always be a space (generally at least 0.090 of an inch) between the stacked plates 68 and the wall surface of the motor housing chamber 70 of the motor housing 22. If electrical energy could be conducted from the stator 66 to the motor housing 22, then that electrical energy could be passed through the water going through the annular chamber of the internal chamber 20 and would result in applying a shock to the humans in contact with water within the tub. Obviously, this would not be desirable, and it is for that reason that there must always be space between the stator 66 and the motor housing 22. To insure that there is always such space, the stator 66 has mounted thereon a pair of electrically insulative, generally plastic, rings 72 and 74. The rings 72 and 74 are identical. These rings 72 and 74 are fixedly positioned onto the stator 66 and also are fixedly mounted relative to the motor housing 22. Therefore, the stator 66 is fixed in position relative to the motor housing 22.

Recirculating water is able to enter the chamber 76 of the seal plate 12. However, it is undesirable for that water to move toward motor housing 22. Therefore, the output shaft 44 is surrounded by seals 78 and 58 whose function is to prevent the conducting of water into the chamber 80 between the motor housing 22 and the seal plate 12. The motor housing chamber 82 is to be completely filled with an oil. By filling of the chamber 82 with oil, the heat created during the energizing of stator 66 to rotate the rotor 62 can be effectively transferred to the motor housing 22 which also functions as a heat exchanger. A desirable type of oil would be a naphthenic mineral oil. It is understood to be within the scope of this invention that oil is to include any liquid that is non-electrically conductive and functions to transfer heat. It is to be noted that the stator 66 and the rotor 62 are completely submerged within the oil.

The chamber 82 is completely closed with the oil being prevented from being leaked therefrom by the seal 98 and O-ring 86. Electrical connection with the stator 66 and the rotor 62 is provided by means of the series of electrical connectors 88 which are mounted within an end plate 96 which closes off the motor housing chamber 82. The end plate 96 is then enclosed by the end cap 16.

The seal plate 12 is integral to the base 90. The base 90 is to be utilized to fixedly secure pump 10 at its desired installed location by a series of fasteners (not shown) with each fastener to connect with a hole 92 formed within the base 90. An O-ring 94 is mounted between the volute section 18 and the seal plate 12 in order to prevent leakage of water therebetween.

The operation of the pump 10 of this invention is as follows: Electrical power is supplied to the stator 66 and rotor 62 which will result in the rotor 62 and the output shaft 44 rotating. This will cause rotation of the impeller 30 which results in water being pumped from the inlet conduit 32 to the outlet conduit 42. However, some of the water from impeller chamber 26 is conducted through inlet passage 24 and into the annular chamber of the internal chamber 20. This amount of water within the annular chamber of the internal chamber 20 absorbs the heat from the motor housing 22 that is created during the operation of the motor. This heated water is then dispensed through the outlet opening 28 into the discharge chamber 40 and then into the outlet conduit 42. As long as the pump 10 is being operated, there is a constant steady flow of water through the internal chamber 20. It is very possible that within a typical spa or hot tub that the amount of heat generated from the pump 10 will be sufficient to maintain the water in the spa or hot tub at the desired level for the human users, not requiring the addition of any further heat.

What is claimed is:

1. A pump designed for use in a recirculating water conduit comprising:

an electric motor having a stator surrounding a rotor, said rotor being connected to an output shaft, an impeller being connected to said output shaft, said impeller being located in a pump housing, rotation of said impeller causes liquid to flow through said housing;

a pump motor housing encompassing said electric motor, said impeller being located exteriorly of said pump motor housing, said pump motor housing defining a completely enclosed chamber which has an exterior wall surface defined by said pump motor housing, a plurality of electrically insulative rings fixedly mounting said stator to said pump motor housing so said stator is spaced from said exterior wall surface, said rings preventing conducting of electricity from said stator to said pump motor housing;

oil substantially filling said completely enclosed chamber submerging said rotor and said stator; and a seal plate surrounding said pump motor housing forming an annular chamber therebetween, liquid flow from said conduit through said annular chamber is to be in direct contact with said pump motor housing to absorb heat from said oil through said pump motor housing with the liquid to then return to said conduit.

2. The pump as defined in claim 1 wherein:

said electrically insulative rings comprising a pair of spaced apart plastic rings, said plastic rings being fixedly mounted on said stator.

3. The pump as defined in claim 1 wherein:

baffle means located within said annular chamber, said baffle means functioning to direct the flow of the liquid through said annular chamber.

4. A heat exchanging pump for moving of a liquid within a liquid conduit, said pump comprising:

an electric motor having a stator;

a motor housing totally encasing said electric motor forming a completely closed chamber;

a plurality of electrically insulative rings mounted about said stator and between said stator and said motor housing for preventing conductance of electricity between said stator and said motor housing;

oil filling said completely closed chamber submerging said stator; and a seal plate encasing said motor housing with there being a space therebetween, said space defining a flow path for liquid, liquid to flow through said flow path and absorb heat from said oil through said motor housing and then the liquid is to be dispensed to said conduit to be then utilized to heat a body of liquid.

5. The heat exchanging pump defined in claim 4 wherein:

said space being annular and surrounding said motor housing.

6. The heat exchanging pump as defined in claim 4 wherein:

said flow path having a single inlet and a single outlet, both said single inlet and said single outlet adapted for connecting with said liquid conduit.

7. The heat exchanging pump as defined in claim 4 wherein:

baffle means located within said space being for the purpose of directing the flow of the liquid through said flow path.

8. The heat exchanging pump as defined in claim 4 wherein:

said electric motor having a rotor, said rotor being mounted in conjunction with said stator with said rotor being rotatable relative to said stator, said rotor being connected to an impeller, said impeller adapted for being mounted within said liquid conduit, said impeller functioning to cause the movement of said liquid within said liquid conduit.

* * * * *